C. M. JENNE.
Wheel-Cultivator

No. 48,817.

Patented July 18, 1865

Witnesses:
C. L. Topliff
Henry Morris

Inventor:
C. M. Jenne
Per Munn & Co.
Attys.

UNITED STATES PATENT OFFICE.

C. M. JENNE, OF YOUNG AMERICA, ILLINOIS.

IMPROVEMENT IN CULTIVATORS.

Specification forming part of Letters Patent No. 48,817, dated July 18, 1865.

*To all whom it may concern:*

Be it known that I, C. M. JENNE, of Young America, in the county of Warren and State of Illinois, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1:
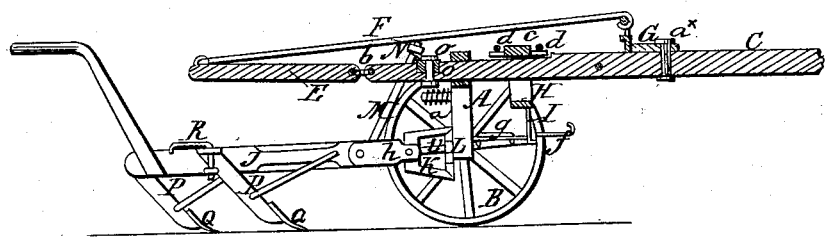
Figure 2:
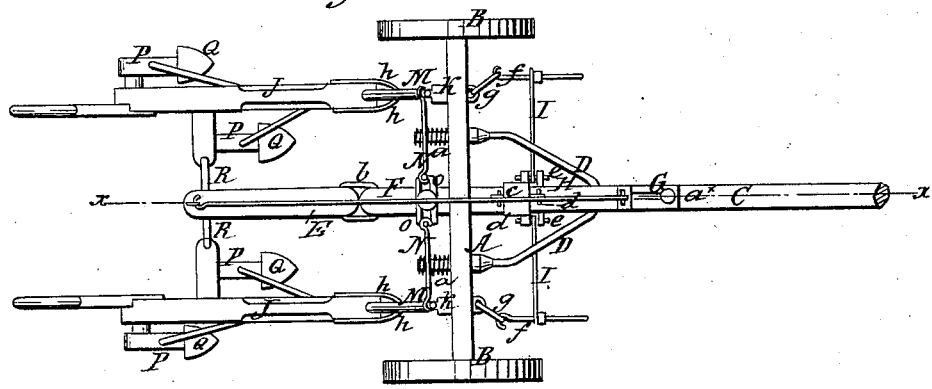
Figure 3:
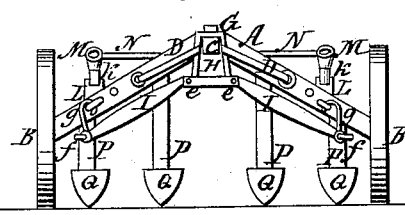

Figure 1 is a side sectional view of my invention, taken in the line $x\,x$, Fig. 2; Fig. 2, a plan or top view of the same; Fig. 3, a front view of the same.

Similar letters of reference indicate like parts.

This invention relates to a new and improved cultivator for plowing or cultivating corn and other crops which are grown in hills or drills; and it consists in a novel construction and arrangement of parts, as hereinafter fully shown and described, whereby the plows may be adjusted laterally and vertically with the greatest facility, and at the same time a very strong and durable implement obtained for the purpose specified.

A represents the axle of the device, which is of V form, or inclined downward from its center at both sides, as shown clearly in Fig. 3. This axle is of cast or wrought iron, has a wheel, B, at each end of it, and the draft-pole C passing through its center loosely, so as to admit of a certain degree of play of the axle on the draft-pole. The axle is represented as being in one piece; but it may, if desired, be formed of two equal parts or pieces and connected to the draft-pole by joints or hinges.

D D represent two stay-rods, which project from the draft-pole C, one from each side, and pass through the axle A, said rods having spiral springs $a$ on them back of the axle. These stay-rods and springs serve to brace the axle and draft-pole, and at the same time admit of a forward and backward play or movement of the axle at either side of the draft-pole.

To the rear end of the draft-pole a bar, E, is attached by a hinge or joint, $b$, and this bar is sustained or held in proper position by a rod, F, which is attached to the back end of E and extends forward to a plate, G, on the draft-pole, the former being secured to the latter by a screw, $a^x$, which passes through an oblong slot in the plate into the draft-pole. By this arrangement the bar E may be held or sustained in a more or less inclined position by adjusting the plate G farther forward or backward on the draft-pole.

On the draft-pole, just in front of the axle A, there is placed a stirrup, H, which is attached to a shaft, $c$, the ends of which are fitted and work in suitable bearings, $d$, on the draft-pole. To the lower ends of this stirrup bars I are attached by pivots $e$, and the outer ends of these bars are fitted on rods $f$, the back ends of which are connected by links $g$ to the axle A, as shown clearly in Fig. 3. The whiffletrees are attached to the front ends of the rods $f$, and it will be seen that by this arrangement the bars I are allowed to yield or give with the axle A, and a simple and efficient draft-equalizer obtained.

J J are two plow-beams, the front ends of which are attached by metal plates $h\,h$ to V-shaped bars K, the upper and lower ends of which are provided with pivots or journals, which are fitted in the upper and lower ends of bars L L, the latter being secured to the axle A by central pivot-bolts, $i$. By connecting the beams J with the axle A in this manner a universal-joint connection is obtained, and the beams may be raised and lowered and moved vertically as required. The front ends of the beams J J have rods M fitted in them, the upper parts of which are connected by links N with adjustable bars O O, attached to the draft-pole C. By adjusting these bars O farther inward or outward from the draft-pole the beams J J may be secured at a greater or less distance apart.

Each plow-beam has two standards, P P, attached to it, the lower ends of which have shovel-shares Q attached to them, of the usual or any proper form, and to the upper end of each inner standard, P, there is secured a hook, R. These hooks, by raising the rear ends of the beams J J, are fitted on the rod F, and the shares or plows Q are thereby held up above the surface of the ground at a greater or less height, as may be desired, by adjusting the bar E in a more or less inclined position by securing the plate G farther forward or backward on the draft-pole.

By having the axle A arranged, as shown, so that it will yield or give, the implement is prevented from being strained or broken in case any of the plows meet with obstructions.

I claim as new and desire to secure by Letters Patent—

1. The axle A, arranged or applied to the draft-pole C, substantially as shown, to admit of a forward and backward play thereon, for the purpose set forth.

2. In combination with the above, the rods D D, attached to the draft-pole C and passing through the axle A, with springs *a* on their rear ends, to operate substantially as and for the purpose herein set forth.

3. The stirrup H, applied to the draft-pole C, in combination with the bars I I, rods *f*, links *g*, and axle A, all arranged substantially as and for the purpose specified.

4. The rods M M, attached to the plow-beams J J, and connected by links N N with the adjustable plates O O on the draft-pole C, substantially as and for the purpose set forth.

5. The bar E, connected by a hinge or joint, *b*, with the rear of the draft-pole C, in combination with the rod F and adjustable plate G, for the purpose specified.

C. M. JENNE.

Witnesses:
OSCAR JENNE,
W. H. JENNE.